Fig.-1

Sept. 17, 1929.  C. CHISHOLM  1,728,390
EMBOSSING MACHINE
Filed Sept. 10, 1927  7 Sheets-Sheet 3

Sept. 17, 1929.　　　C. CHISHOLM　　　1,728,390
EMBOSSING MACHINE
Filed Sept. 10, 1927　　　7 Sheets-Sheet 5

FIG.-.7

Sept. 17, 1929.  C. CHISHOLM  1,728,390
EMBOSSING MACHINE
Filed Sept. 10, 1927  7 Sheets-Sheet 6

FIG.-8

Inventor
Clifton Chisholm
By Bates, Macklin, Lobrick & Teare
Attorneys

Sept. 17, 1929.　　　C. CHISHOLM　　　1,728,390
EMBOSSING MACHINE
Filed Sept. 10, 1927　　　7 Sheets-Sheet 7

Patented Sept. 17, 1929

1,728,390

UNITED STATES PATENT OFFICE

CLIFTON CHISHOLM, OF CLEVELAND, OHIO, ASSIGNOR TO THE AMERICAN MULTIGRAPH COMPANY, OF CLEVELAND, OHIO, A CORPORATION OF OHIO

EMBOSSING MACHINE

Application filed September 10, 1927. Serial No. 218,803.

My prior patent #1,557,754 issued October 20th, 1925, shows, describes and claims an embossing machine for producing printing strips. That machine has a rectilinearly reciprocable die head carrying a straight row of male dies and an opposing row of female dies, and means for progressing a ribbon of material to be embossed between such rows and lengthwise thereof. The die head is shiftable longitudinally electro-magnetically under the control of a key-board, the actuated key of which initiates the electro-magnetic operation and also determines the position to which the die head is moved.

The object of the present invention is to simplify the machine referred to in many respects, thus producing a much cheaper machine which, while not having the rapidity of the patented machine, will still be satisfactory and efficient for the use intended. One of the main points of simplification comprises the substitution for the key-board and electro-magnetic mechanism of a compound manual lever which is connected with the rectilinearly movable die head that by lateral movement may directly position the die head according to the position given the lever, whereupon a downward movement of the lever may initiate the embossing operation. Other features will be apparent from the following detailed description of an embodiment of my invention.

The frame of my machine consists primarily of a horizontal bed plate 10 mounted on suitable legs 11 together with various standards, brackets and ears, secured to the plate and hereinafter described. Two of such frame standards 12 and 13 comprise plates rising from opposite sides of the bed plate and connected by cross bars 14, 15, 16 and 17. The bars 14 and 15 support stationary housings 18 and 19 for the embossing plungers 120 hereinafter described. The bars 16 and 17 provide a guideway for the ribbon A to be embossed.

The reciprocable die head, designated 20, comprises a block bifurcated above and below; that is to say, that in the upper surface is a groove 21 enabling the block to embrace the opposite sides of the lower portion of the bars 16 and 17, and in the under side of this die head is the groove 22 whereby the block may straddle the supporting bar 30. The die block carries in the slot 22, a pair of rollers 23 riding on the top of the supporting bar 30, and rollers 24 bearing against the outer sides of the cross bars 16 and 17.

Figure 8:
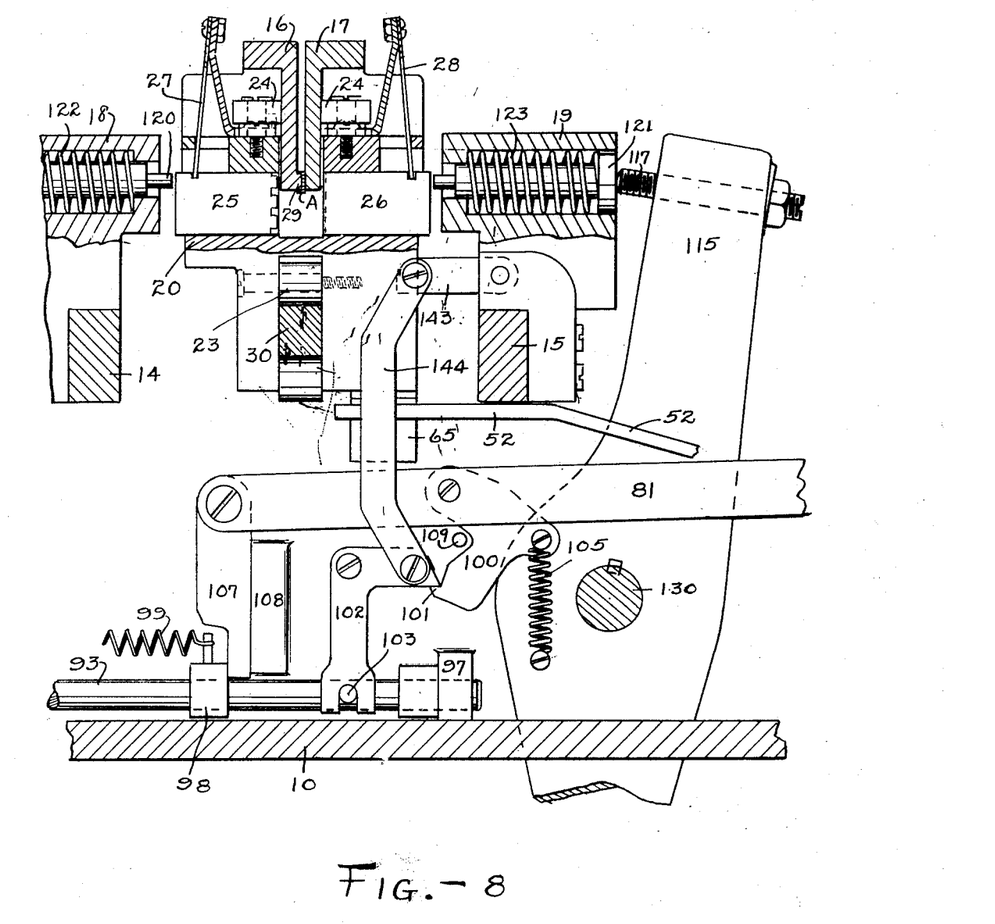
Fig. 8 is a vertical longitudinal section through the die head and adjacent parts, showing some of the cooperating parts in side elevation, this view being in the nature of an enlargement in portion of Fig. 2.

The die head carries a row of die blocks 25 having on the forward end (right hand end, Fig. 2) a vertical row of three male dies and a corresponding row of blocks 26 having on their rear ends a vertical row of corresponding female dies. The teeth of comb springs 27 and 28 carried by the die head tend to keep these blocks apart, but at the proper time of operation the plungers 120 in the housings 18 and 19 force the pair of dies, which are centrally positioned, toward each other to emboss the interposed metal strip A. This strip in this region is channel-shaped as shown in Fig. 8 and is guided on a rib 29 on the lower portion of the cross bar 16. Such rib and the lower portions of these bars is cut away in the central region of the machine to allow the die blocks to be plunged toward each other.

Figure 6:
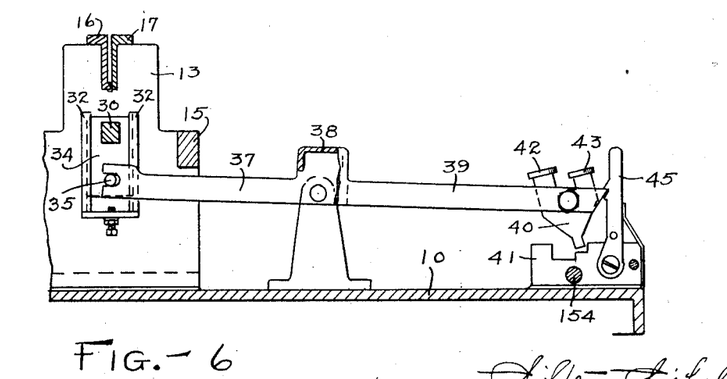
Fig. 6 is a vertical section substantially on the offset plane indicated by the line 6—6 on Fig. 1 and showing parts of the shift mechanism.

The supporting bar 30, for the die head, is bodily shiftable vertically into as many different positions as there are die characters on a block, and mechanism to thus shift the bar enables the selection of the upper, lower or intermediate die face as desired. The shift mechanism for the die head is best shown in Fig. 6. On the inner face of each of the vertical frame plates 12 and 13 are a pair of guiding ribs 31 and 32 and between the ribs of each pair is a slide 34. The ends of the bar 30 are mounted in these slides. Projecting inwardly from the slides are pins 35. These pins are embraced by the forked inner ends of a pair of rock levers 36 and 37 which are connected by a cross bar 38. A forward extension 39 of the lever 36 provides for the manual operation of the levers 36 and 37 and thus for the raising of the die head, gravity normally holding the die head in its lowermost position with the uppermost face of the dies opposite the ribbon. The weight of the die head is partially counterbalanced by the spring 47 attached to the lever 39.

I have shown a Y-shaped finger member 40 pivoted to the forward portion of the lever 39. A suitable stepped abutment block 41 is secured to the bed plate 10 beneath this Y-lever. If the operator presses down on the finger button 42 on the rear leg of the Y-lever, this swings forwardly the lower end and such lower end strikes the highest available step on the abutment block, with the result that the die head is lifted only sufficiently to bring the intermediate die characters into line with the ribbon. Upon the other hand, if the operator presses down on the forward finger button 43, the Y-lever is rocked rearwardly and the lever 39 is thus moved downwardly until the Y-lever meets the second step of the abutment block, and this brings the lowermost face of the die opposite the ribbon. A suitable latch 45 (Figs. 2 and 3) having a pair of rearwardly facing ratchet teeth, may coact with the forward end of the lever 39 and thus retain such lever in either of its depressed positions.

It is convenient to arrange the die characters in three rows corresponding to upper case, lower case, and numerals and punctuation points. Before the die head is shifted, it is convenient to determine which of the rows is to be used for the character to be embossed, and then the corresponding switch key is depressed or the die head left in its normal position as required.

The manual lever for shifting the die head horizontally along its supporting bar 30 to select the die block will now be described. This lever is a compound device comprising, first, a lever arm 50 on a vertical stationary pivot pin 51 rising from the frame; second, a rearward extension of this lever arm in the form of a plate 52 rigidly secured to the upper end of the hub of the arm and loosely extending around the corresponding embossing lever 115 and its rear end connected with the die head; third, a forwardly extending arm 55 pivoted to the arm 50 on horizontal pivots 56; and fourth, a spring 60, anchored to the arms 50 and 55 and lifting the latter against an adjustable abutment screw 62, carried by the arm 50.

Figure 4:
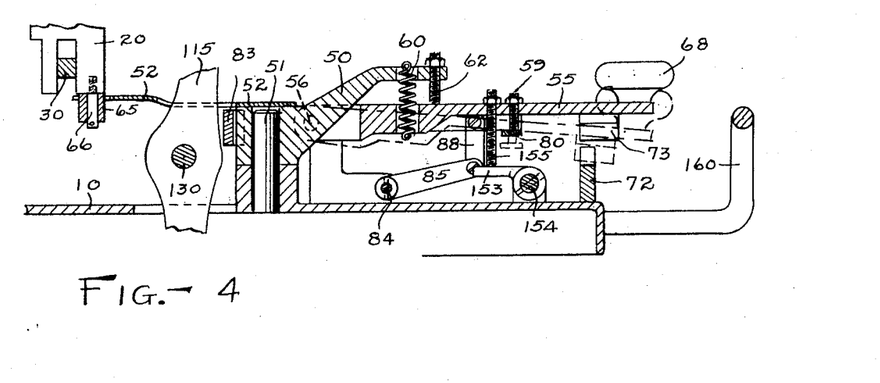
Fig. 4 is a vertical longitudinal central section of the forward portion of the machine.
Figure 5:
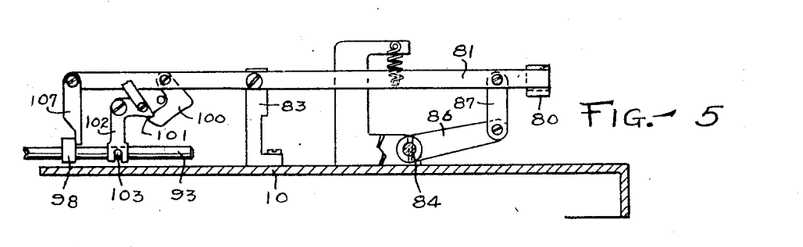
Fig. 5 is a vertical section on a plane parallel with Fig. 4 but nearer the left hand side of the machine, as indicated by the line 5—5 on Fig. 1.
Figures 9, 12:
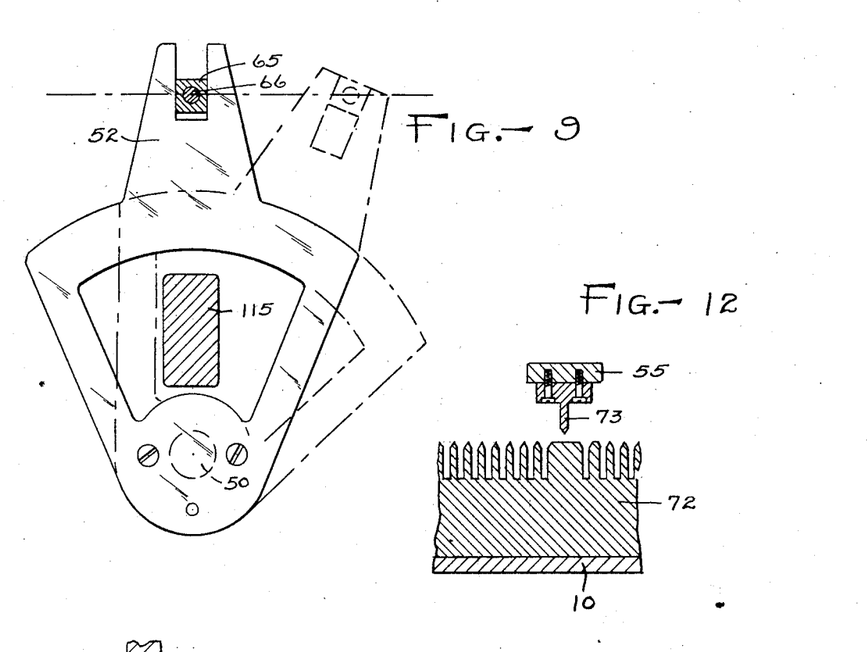
Fig. 9 is a detail illustrating the connection between the main lever and the die head, being a horizontal section as indicated by the line 9—9 on Fig. 7.
Fig. 12 is a detail of the comb which coacts with the main lever, being a vertical section on the line 12—12 of Fig. 1.

The compound lever just described is swung manually horizontally as a unit about the vertical pivot pin 51. The rear end of the extension 52 is bifurcated and slidably embraces a flat sided block 65 (see Figs. 4 and 9) rotatively mounted on a pin 66 depending from the die head. The forward end of the arm 55 of the compound lever carries a hand knob 68. Accordingly, when this hand knob is grasped by the operator and the lever swung in one direction from another, the die head is moved along the bar 30 to bring the desired pair of dies between the plungers 120.

The arm 55 preferably carries a pointer 69 which stands adjacent to the arcuate edge of an indicating plate 70, extending horizontally above the lever and free from it. The forward edge of this plate is marked with the various characters corresponding to the dies. I have illustrated in Fig. 1, a row of alphabetical characters (which serves as an indication for both the upper and lower case rows of the die head) and behind this a row of punctuation marks, numerals, and special characters, corresponding to the third row of die faces.

Figure 1:
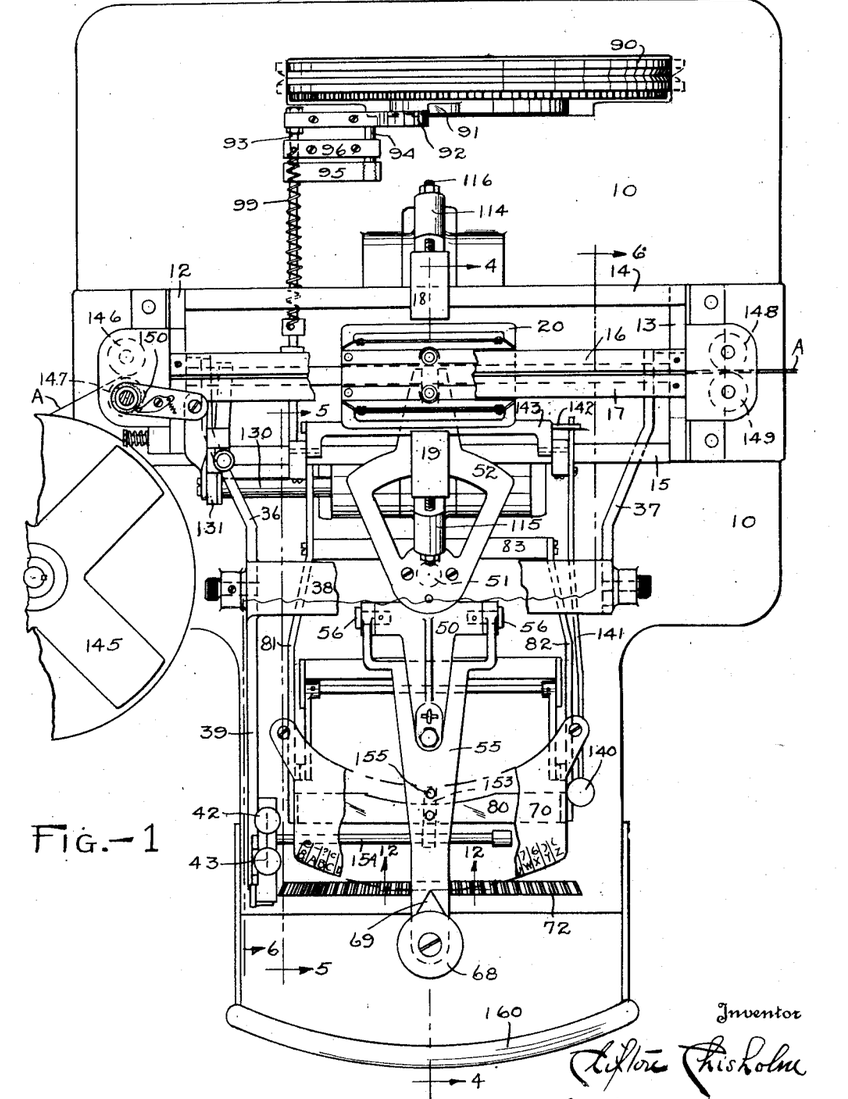
Fig. 1 is a plane partly broken away, of an embossing machine in accordance with the present invention.
Figure 7:
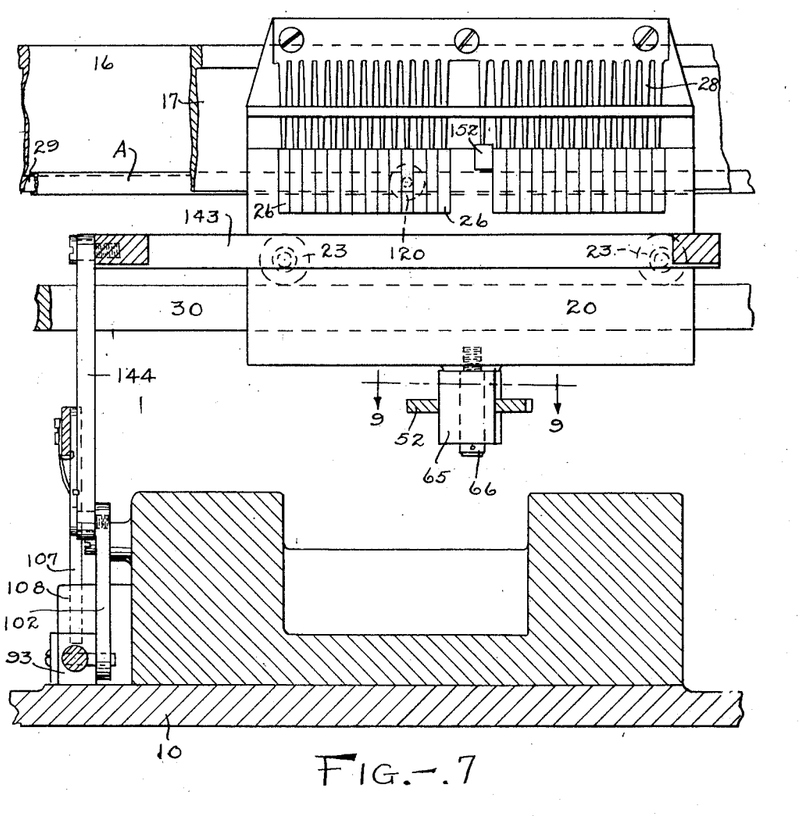
Fig. 7 is a cross section on an enlarged scale transverse of the machine just in front of the die head.

When the die head has been brought into the desired position by the lateral movement of the knob as described, the next operation is a downward movement of the knob, which locks the lever and die head in position and initiates the embossing operation. To effect the locking, I provide across the machine beneath the lever arm 55 a stationary comb 72 (Figs. 1 and 12) having upwardly facing notches with beveled entrances, and I provide on the under side of the lever 55 a beveled-edged blade 73 to coact with these notches. The notches in the comb have their walls arranged radially with reference to the pivot pin 51 as shown in Fig. 1. The bevels of the blade and walls of the notches accurately position the die head and hold it locked when the knob is depressed. The dies are preferably equally spaced on the die head, that is, the die blocks are of equal width and stand one against the other in the die head, as shown in Fig. 7. As the comb 72 is parallel with the path of movement of the die head, it follows that the notches will be equally spaced to cause each notch to correspond to a die block, though as the pivot 51 is further from the comb than from the die, the unit of spacing of the comb will be greater than that of the die.

The arrangement of the characters on the indicator 70 being in a curve concentric of the pivot 51, should be differential to correspond accurately with the notches; that is to say, the characters become closer together as one progresses from the center toward the extremes, but accuracy in this indicating scale is not necessary, as the beveled faces of the comb and lever blade 73 accurately position the die head.

I will now describe the embossing mechanism per se, which is initiated by the downward movement of the knob 68.

Extending transversely of the machine, beneath an adjusting screw 59 on the arm 55 of the compound lever is a universal bar 80 secured to the forward ends of a pair of arms 81 and 82 pivoted in axial alignment to a bracket 83. The arms 81 and 82 are connected also by a rock shaft 84 having arms 85, and 86 connected by links 87 and 88 to the arms. The arm 81 extends rearwardly of its pivot and operates to release a single rotation clutch to cause an operation of the embossing mechanism.

The single rotation clutch may be of any approved form. It is illustrated in Fig. 1 as embodied in a main belt pulley 90. The clutch has a shoulder 91 normally engaging a slidable abutment 92 which normally holds the clutch open. When this abutment is drawn forwardly to clear the shoulder 91, the clutch goes into action and makes a single rotation. At the conclusion of the rotation if the abutment has returned to position, the shoulder 91 strikes this abutment and terminates the rotation. This is a usual method of operation of single rotation clutches and it is not deemed necessary to explain it in detail, as any single rotation clutch may be employed, for instance, the clutch shown in my prior Patent #1,557,754.

I prefer to make the abutment 92 in the form of a comparatively stiff leaf spring which provides a shock absorber when the shoulder 91 impinges the abutment at the conclusion of the rotation. This abutment is carried by a pair of rods 93 and 94 which are connected by a cross bar 95 and intermediately are slidably mounted in a stationary bracket 96 secured to the bed plate 10. The rod 93 extends forwardly from the cross bar 95 and near its forward end is guided in a bracket 97 (Fig. 8) rising from the bed plate. Secured to the rod 93 is a collar 98 forming an anchorage for the forward end of a tension spring 99, the rear end of this spring being connected to the stationary bracket 96. The spring thus tends to return the abutment 92 into position in the path of the clutch shoulder 91.

Pivotally connected to the trip lever 81, is a dog 100 (Fig. 8). This dog has a shoulder 101 normally beneath the horizontal arm of a bell crank 102 pivoted to a stationary bracket of the machine. The lower end of this bell crank is bifurcated and engages a pin 103 projecting from the rod 93. A spring 105 anchored to the dog and to some other suitable point, keeps the dog shoulder normally in the position shown in Fig. 8. Pivotally depending from the rear end of the lever 81 is a block 107 normally lying between the collar 96 on the rod 93 and the stationary rib 108 of the frame. This block in this position forms a lock preventing the release of the clutch. However, when the arm 55 of the compound lever is depressed, the concomitant elevation of the rear end of the lever 81 withdraws the lock 107 and by reason of the dog 100 rocks the bell crank 102, drawing the rod 93 forwardly, thereby releasing the single rotation clutch, which causes the embossing operation as present described. The continued upward movement of the rear end of the arm 81 causes an inclined edge of the dog 100 to engage a stationary pin 109 (Fig. 8) which cams the dog out of engagement with the bell crank 102 and this releases the clutch rod 93 so that it returns to position, bringing the abutment 92 into the path of the clutch lug 91. When the lever 81 returns to normal position, consequent upon the operator removing the pressure from the knob 68, the locking block 107 descends between the collar 98 and the rib 108 and thereby locks the clutch release.

When the clutch has been released as above described, its operation is to give a single rotation to the cam shaft 110. On this shaft are a pair of grooved cams 112 and 113 which coact with the lower ends of a pair of levers 114 and 115. Each lever carries near its upper end an adjustable abutment pin 116 and 117 which is designed to coact with the corresponding plunger 120 and 121, heretofore referred to in the housings 18 and 19. The plungers are normally held back from the die head by springs 122 and 123 within the housings. When the die head has been positioned the selected dies are directly between the inner ends of the two plungers, and, accordingly the operation of the cams 112 and 113 rocking inwardly the upper ends of the embossing levers, cause these plungers to shove the dies 25 and 26 toward each other, thus embossing the interposed strip A.

Figure 2:
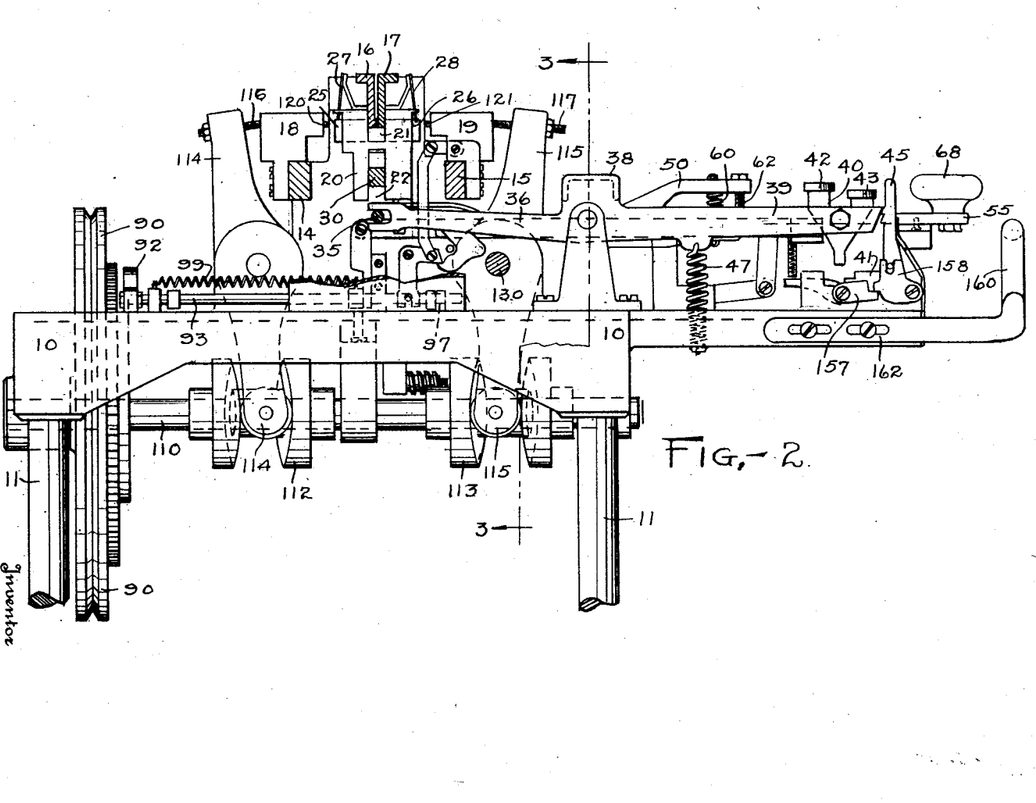
Fig. 2 is a sectional side elevation thereof looking from the left hand side.
Figure 3:
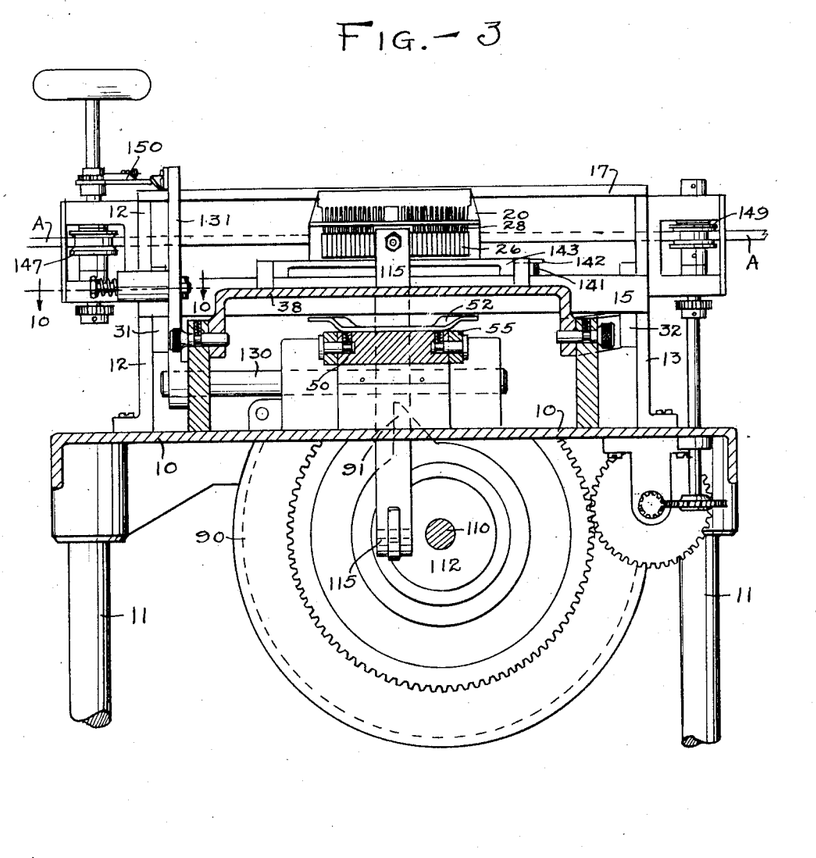
Fig. 3 is a vertical cross section substantially on the offset plane indicated by the line 3—3 in Fig. 2.
Figure 10:
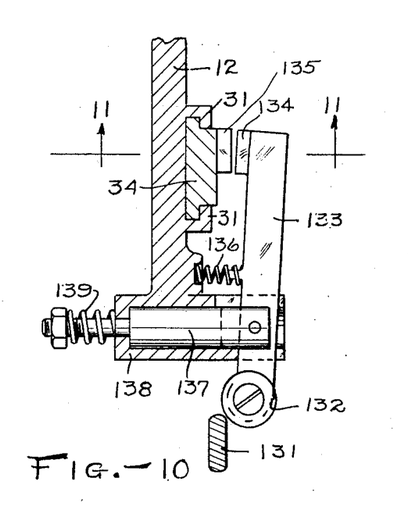
Fig. 10 is a detail of the indexing mechanism for the die head shift, being a horizontal section on the line 10—10 in Fig. 3.
Figure 11:
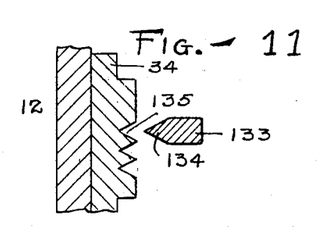
Fig. 11 is a cross section of the same parts in a plane indicated by the line 11—11 in Fig. 10.

Before the plungers engage the die blocks, an accurate locking of the die head in its selected elevation, as controlled by the shift, takes place, thus insuring proper horizontal alignment of characters. The mechanism for effecting this is best shown in Figs. 2, 10 and 11. The embossing lever 115 is rigid on a lock shaft 130, which carries a rock arm 131 which at the beginning of the movement of the lever 115 engages a roller 132 on a lever 133 pivotally carried by the standard 12. The rear end of this lever has a beveled face 134, which is designed to enter any of three notches 135 on the slide 34, according to the vertical position of such slide, as given by the shift key. This accurately locks the elevation and maintains it until the embossing action is completed. On a return stroke of the embossing arm a spring 136 returns the lever 133 to normal position. To prevent strain on the parts the lever 133 is not pivoted positively to the standard 12, but to a plunger 137 mounted in a housing 138 formed on such standard, the plunger being normally maintained seated in the housing by a stiff spring 139.

Comment has been made that the rearward extension 52 of the compound main lever was of sector shape with an opening of considerable extent through it. It is through this opening that the forward embossing lever 115 extends. The opening enables the oscillating hand lever to clear the embossing lever in all positions of either lever.

During the second half of the rotation of the cams 112 and 113, the embossing levers are rocked in the opposite direction to their embossing movement, and the springs 122 and 123 withdraw the plungers, and the comb springs 27 and 28 withdraw the dies. Thereupon the operation stops, ready for a succeeding actuation.

It is sometimes desirable to repeat the same character a number of times, as for instance when striking dashes leading across the page. This, of course, might be accomplished by separate operations of the knob 68, but I prefer to provide a special repeat key. Such key is shown in Fig. 1 at 140. It is on the forward end of the pivoted lever 141, the rear end of which lies beneath a pin 142 on a universal bail 143. This bail is connected by a link 144 (Fig. 8) with the bell crank 102. Accordingly, the depression of the key 140 retains the rod 93 after it has been withdrawn by the depression of the knob 68 in its withdrawn position thus causing successive embossing of the same character to be continued indefinitely so long as the key 140 is held down. It is impossible however, to initiate an original embossing action by the key 140 along, because the block 107 (Fig. 8) prevents the withdrawal of the rod 93 until the knob 68 is depressed.

The ribbon of material A is fed from a supply thereof, on a reel 145, along a path transversely of the machine where it is embossed, cut off and finally delivered. The ribbon passes first between a pair of rolls 146 and 147 which not only feed the ribbon but flange the edges of it so that it becomes channel shaped, whereby it is guided by the rib 29 on the cross bar 16. The ribbon is delivered by a pair of rolls 148 and 149 which bend in the edges of the channel shaped strip so that it is suitable for mounting over the projections of a holder.

The mechanism for effecting the ribbon feed is substantially the same as that shown in my prior patent mentioned, and need not here be more fully described further than to say that the roller 147 is connected by a ratchet mechanism 150 with the arm 131 on the rock shaft 130 on which the embossing lever 115 is mounted, so that on the back stroke of the embossing lever, the ribbon is fed forwardly a distance corresponding to one character. The discharging rollers 148 and 149 are continuously rotated by being suitably geared with the main pulley and operate to bend in the flanged edges and discharge the cut off strip whenever it is shoved into the bite of these rollers.

The shearing of the embossed portion of the strip from the following portion is effected by a pair of shearing dies 152 in the die head, controlled by the operation of the knob 68 in a particular position. That is to say, when the lateral movement of this knob has brought the dies 153 between the plungers 120 and 121, then the downward movement of the knob causes the operation already described of the embossing mechanism to effect the shearing similarly to the operation of an ordinary character die. It will be noticed however, that the shearing dies are provided only in the upper row of characters and hence to shear this strip it is necessary that the die head be in its lowermost position.

To prevent any attempted shearing when the die head is in either of its shifted positions, I provide an interlock between the shift mechanism and the shearing mechanism. Thus, the arm 55 of the compound lever carries an adjustable pin 155 which is normally idle, but when the lever is in the shearing position stands directly over an arm 153 on a rock shaft 154. The shaft carries a dog 157 which lies beneath a shoulder on a dog 158 which is conncected with the shift latch 45. Accordingly, the first downward movement of the knob 68 in a shearing position withdraws the latch 45 so that if the die head were in either of its elevated positions, it would immediately drop by gravity and would thus be in shearing position before the released embossing mechanism begins to act.

160 in Figs. 1 and 2 indicates a suitable hand rest which may be employed in front of the knob 68, being preferably adjustably mounted on the bed by reason of slotted side arms 162, clamped to the bed. This rest may be employed or not, as the operator desires.

It will be seen that by the present arrangements, I have greatly simplified the positioning of the die head and the release of the single rotation clutch. I have done away with the necessity of the die head returning to the central position of rest following each operation. Thus, while the lever and knob actuation is necessarily slower than the actuation of a finger key, there is a compensating saving of time for die head movement in those instances where successive characters are close to each other. Fig. 1 illustrates the characters as arranged alphabetically, but higher speed may be possible with characters arranged in so called scientific order similar to that of a standard typewriter keyboard. In such instances, the characters most frequently used are close to each other, enabling very rapid positioning and operation of the knob 68. The machine may be comparatively cheaply constructed; it is easily understood and operated, and there is little about it to get out of order.

I claim:—

1. In an embossing machine, the combination of a transverse guide, a reciprocable die head slidably mounted thereon, embossing dies carried by the head, embossing levers in front of and behind the die head, mechanism for rocking said levers, a manual positioning arm pivoted on a vertical pivot in front of the forward embossing lever and having an opening through which such lever freely extends, said manual lever having a sliding connection with the die head behind the embossing lever.

2. In an embossing machine, the combination of transverse frame members adapted to guide a ribbon of material to be embossed, a die head having a forked upper end extending on opposite sides of such ribbon, a row of male dies and a row of female dies in the die head, said rows being respectively on opposite sides of the ribbon, means for guiding the die head in a path parallel to the ribbon, a manual lever connected with the die head and having a depressible forward portion, and mechanism initiated by a depression of such forward portion to push toward each other selected dies in front of and behind the ribbon.

3. In an embossing machine, the combination of a reciprocable die head, means for guiding it in a straight line, an intermediately pivoted manual lever, a connection between the rear end of the lever and die head whereby oscillations of the lever may reciprocate the die head, a depressible forward extension of the lever carrying a beveled projection and a straight comb parallel with the plane of reciprocation of the die head, and having upwarly facing notches with beveled entrances with which said projection is adapted to coact.

4. The combination of a reciprocable die head, a manual lever for positioning the die head, dies carried by the die head, plunger mechanism for pushing the selected dies toward each other to emboss interposed material, a normally open clutch, mechanism adapted to be driven by the clutch when released to plunge selected dies toward each other, a lock normally preventing the release of the clutch, and manual mechanism for removing the lock and throwing the clutch into action.

5. The combination of a die head, rows of male and female dies carried thereby, means for guiding the die head horizontally transversely of the machine, a compound manual lever mounted on a vertical pivot in front of the die head, a sliding connection between the rear end of the lever and the die head, a depressible forward portion on the lever, a normally open constantly rotating clutch, mechanism adapted to be actuated thereby to move selected male and female dies toward each other to emboss interposed material, a longitudinally movable clutch releasing rod, a release lever actuated by a downward movement of the forward extension of said manual lever, a lock against releasing the movement of said rod movable into idle position by said release lever, and mechanism operable by said release lever for moving the rod to release the clutch.

6. In an embossing machine, the combination of a reciprocable die head, male and female die blocks carried thereby, each having a plurality of characters, mechanism for raising and lowering the support of the die head to select the row of characters desired, mechanism for plunging selected die blocks toward each other, and a precisioning device automatically engaging the support for the die head to lock it in any of its given positions preceding the embossing action.

7. In an embossing machine, the combination of a reciprocable die head, dies carried thereby, each having a plurality of characters, a raisable support for the die head, shift key mechanism for raising the support, said support having a plurality of notches, and a beveled detent automatically caused to enter the corresponding one of said notches preceding the embossing action.

8. In an embossing machine, the combination of a reciprocable die head, a row of male dies and a row of female dies carried thereby, each having a plurality of characters arranged vertically, a raisable support for the die head, shift mechanism for operating the support, said support having a plurality of notches, a lever having a beveled nose adapted to enter the notch opposite it to accurately position the elevation of the die head, a pair of levers for forcing selected dies toward each other, mechanism for rocking said levers in the embossing direction and then returning them, and an arm moved by one of the embossing levers and adapted to engage the lever having the beveled nose to cause such nose to enter the juxtaposed notch just preceding the embossing action.

9. In an embossing machine, the combination with means for guiding a ribbon of material to be embossed, a reciprocable die head carrying die blocks on opposite sides of said ribbon, a manually operable oscillating lever for shifting the die head, said die head carrying dies for shearing the embossed strip, mechanism whereby a downward movement of a portion of the lever in a certain position operates the shearing dies, said die blocks having several characters whereby there are a plurality of rows of characters, the shearing dies pertaining to only one row, mechanism for shifting the die head to select the row, and an interlocking device between the shift mechanism and said lever operable only when the lever is in the shearing position to insure the row having the shearing dies being in active position when the shearing operation takes place.

10. In an embossing machine, the combination of a transverse bar, a die head shiftable longitudinally on the bar, multiple faced dies carried by the die head, shearing dies carried by the die head in the row of one face of characters only, a horizontally oscillatable hand lever for shifting the die head to bring selected dies into active position, plunger mechanism for moving such selected dies toward each other, mechanism for shifting the support for the die head to select different character faces, a latch for such shifting mechanism, mechanism operated by a downward movement of the forward part of the oscillatable lever for moving selected dies toward each other, a rock arm connected with the latch for the shift mechanism and a \ in on the depressible part of the hand lever adapted to coact with the rock arm only when the lever has positioned the die head with the shearing dies in the vertical region of the plunger mechanism.

11. In an embossing machine, the combination of a reciprocable die head, male and female dies carried thereby, a hand lever, a connection between the same and the die head whereby the hand lever may position the die head, mechanism for operating selected dies, said hand lever having a movable portion adapted to actuate said mechanism, a repeat key adapted to cause successive actuations of said mechanism, and a lock preventing the effectual actuation of the repeat key unless the hand lever is in actuated position.

12. In an embossing machine, the combination of a reciprocable die head, male and female dies carried thereby, means for guiding the die head in a straight path transversely of the machine, a horizontally oscillatable manual lever having its rear end connected to the die head and having its front portion depressible, mechanism for moving selected dies toward each other controlled by a normally open clutch, means for releasing the clutch to render it active, a lock for such release, mechanism operated by the depression of the forward end of the manual lever to remove the lock from the clutch release and thus release the clutch, and repeat mechanism adapted when actuated to maintain the clutch engaged but not of itself able to remove the lock against initiating such engagement.

13. In an embossing machine, the combination of a reciprocable die head, means for guiding it in a straight line, an intermediately pivoted manual lever connected on one side of its pivot with the die head, whereby oscillation of the lever may reciprocate the die head, a depressible member on the lever, and a straight comb parallel with the plane of reciprocation of the die head and having upwardly facing notches, the depressible member having means to engage said notches.

14. In an embossing machine, the combination of a reciprocable die head having dies of equal width side by side in a straight line, an intermediately pivoted lever connected with the die head, a transversely movable locking member on the lever, a straight comb parallel with the plane of reciprocation of the die head, and having notches of equal width, the locking member coacting with the comb and at least one of them being beveled.

In testimony whereof, I hereunto affix my signature.

CLIFTON CHISHOLM.